United States Patent Office 3,071,323
Patented Jan. 1, 1963

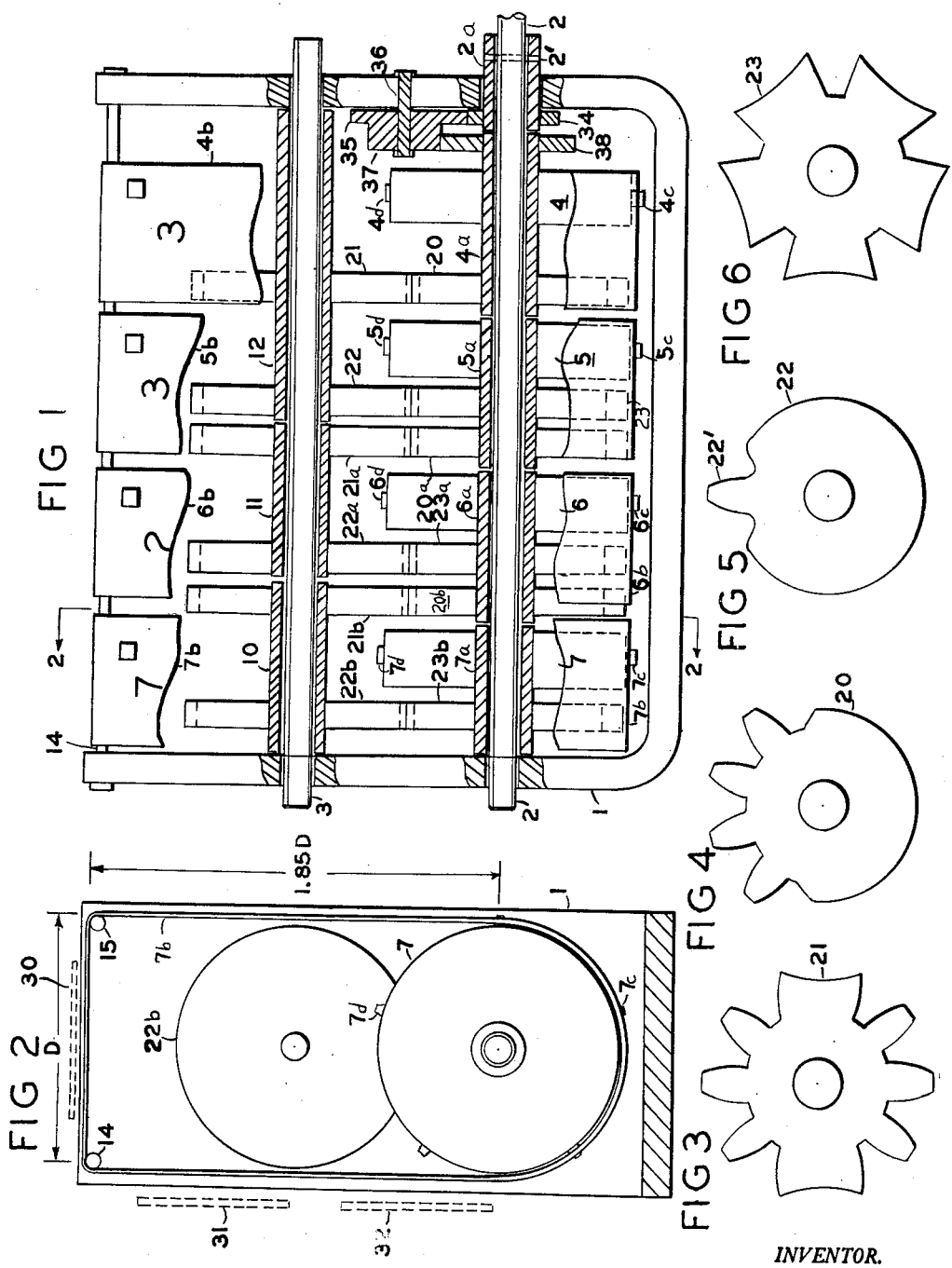

3,071,323
DIGITAL COUNTER INDICATOR MEANS
Anwar K. Chitayat, Plainview, N.Y., assignor to
Optomechanisms, Inc., Plainview, N.Y.
Filed Aug. 9, 1960, Ser. No. 48,521
3 Claims. (Cl. 235—125)

This invention relates to counters having digital output and more particularly to such means requiring the minimum space for given size numbers.

Digital counters are known but are generally bulky and not suitable for apparatus such as computers where it is desired to mount a large number of counters or indicators in a minimum space. Prior counters generally have the numbers mounted on a wheel which is wasteful of space and therefore not suitable for the applicant's purpose.

Applicant has found that the minimum space for a given size number is obtained by placing the numbers on continuous belts which are sprocket driven. A preferred size or height of the numbers equals .628D where D is the sprocket diameter. The length of the belt is approximately 10 times the height of the number. The space required where .628D is the height of the number is equal to $D^2 \times 2.35D = 2.35D^3$. For instance, if the height of the numbers desired is $\frac{1}{4}''$ then the space required for each belt and sprocket drive is as follows where the space is indicated as V.

$$V = 2.35D^3$$
$$= 2.35(\tfrac{1}{4})^3 = 2.35(\tfrac{1}{64}) = \text{app. } \tfrac{1}{27} \text{ cu. in.}$$

No additional space is required for the inter-connecting gearing between the sprockets as that is inserted in the hollow space enclosed by the belt between the sprockets. The different pairs of sprockets may be geared together preferably in the ratio of 10 to 1 with an intermittent gear arrangement or with a Geneva type connection, which requires less space than conventional gearing.

Accordingly a principal object of the invention is to provide new and improved digital indicating means.

Another object of the invention is to provide new and improved digital counter means.

Another object of the invention is to provide new and improved digital counter means having minimum space requirements for a given size number.

Another object of the invention is to provide new and improved digital counter means comprising a plurality of endless belts, each belt driven by a sprocket and having numbers consecutively printed thereon, the diameter of each sprocket being approximately equal to the height of the numbers, and said sprockets being connected together in a given numerical ratio, for instance 10 to 1, for a decade counter.

These and other objects of the invention will be apparent from the following specification and drawings of which FIG. 1 is an elevation view of an embodiment of the invention with the belts removed.

FIG. 2 is a side sectional view of the embodiment of FIG. 1.

FIGS. 3 through 6 are detail views showing the sprockets and intermittent gearing.

Referring to the figures the invention generally comprises a U-shaped frame 1 having a pair of axles 2 and 3 rotatably mounted therein. A plurality of sprockets, 4, 5, 6 and 7 having teeth 4c, 4d, 5c, 5d, 6c, 6d, 7c, 7d, are mounted on collars 4a, 5a, 6a and 7a, which are freely rotatable on the axle 2, said sprockets being fixedly mounted to the collars. The collar 2a is fixedly mounted to the axle shaft 2.

The axle 3 has a series of collars 10, 11 and 12 rotatably mounted thereon and these collars contain the interconnecting intermittent gears as will be more fully discussed. Belts 4b, 5b, 6b and 7b are mounted on each sprocket at their lower ends and extend around the idler bars 14 and 15 at their upper ends, the idler bars being connected to the frame 1. The belts from left to right read thousands, hundreds, tens and units.

The input collar 4a on shaft 2 is driven by circular conventional gear 38 fixedly mounted on collar 4a, gear 37 which is mounted on shaft 36, gear 35 connected to gear 37, and gear 34 fixedly mounted on collar 2a which is pinned to shaft 2. Collar 4a has fixedly mounted thereto the mutilated gear 20 FIG. 4 which has teeth approximately halfway around its circumference. The gear 20 meshes with gear 21 FIG. 3 which has teeth around its circumference except for two locations, the arrangement of the gears 20 and 21 being such that two revolutions of the gear 20 will turn the gear 21 one revolution, namely, a two to one ratio. The gear 21 is fixedly mounted on the bearing collar 12 upon which is also mounted the gear 22 FIG. 5 which has only one tooth 22'. The one tooth gear 22 meshes with the gear 23 FIG. 6 on collar 5a which has five indentations adapted to receive the tooth 22' so that there is a five to one ratio between the gear 22 and the gear 23 which is fixedly connected to the collar 5a and sprocket 5. Therefore, there is a ten to one ratio between the collar 4a and the movement of the sprocket 5.

Similarly the next sprocket 6 has a ten to one relation to the sprocket 5 by means of the gears 20a, 21a, 22a and 23a which are identical with the gears 20, 21, 22 and 23.

Similarly the sprocket 7 is driven at a ten to one ratio to the sprocket 6 by means of the similar gears 20b, 21b, 22b and 23b.

Therefore, belts 7b, 6b and 5b on the sprockets 7, 6 and 5, respectively, may indicate thousands, hundreds and tens, and the number of belts may be continued indefinitely.

The intermittent gearing is not suitable for indicating units of shaft revolution so that the units sprocket 4 and belt 4b should be directly geared to the input shaft 2 and collar 2a, in conventional manner by 5:1 ratio gears 34, 35, 37, 38.

The transmittal of motion between any two sprockets is such that for every two rotations of the first sprocket, for instance, sprocket 5, the next sprocket, for instance sprocket 6, is moved by one-fifth of a revolution or 72°. Therefore, ten movements or two revolutions of the driven sprocket will expose the ten numbers on the belt.

Input shaft 2 and collar 2a pinned thereto by pin 2' are geared to sprocket 4 by means of gear 34, fixedly connected to collar 2a, which meshes with gear 35 on shaft 36 with a 2:1 ratio. Gear 37 fixedly connected to gear 35 meshes with gear 38 on collar 4a with a 2.5:1 ratio. Sprocket 4 is fixedly connected to collar 4a. Therefore, each number on belt 4b represents one revolution of shaft 2.

The viewing windows for viewing the numbers may be located at any part of the belt except the bottom, for instance, at the locations 30, 31, 32, etc. If the numbers are made as large as possible where D is the diameter of the sprocket and if one number represents 72° of motion then the length of the belt will equal 720° of motion=6.28D. Referring to FIG. 2 the half circumference at the bottom of the sprocket is equal to 1.57D and the length of the belt between the top bars 14 and 15 is equal to 1D. Therefore, subtracting the sum of these or 2.57D from 6.28D gives a difference of 3.71D. The required distance from the axis of the sprocket to the top of the belt then is half of 3.71D or 1.855D. Space equals $D^2 \times 2.35D$ equals $2.35D^3$.

I claim:

1. Digital counter indicator means comprising a U-shaped frame, first and second parallel shafts rotatably mounted in said frame, a pair of guide bars mounted in said frame across the open end of said U-shaped frame and parallel to said shafts, a plurality of sprockets on said first shaft, a plurality of interlocking gears mounted on said first and second shafts, a plurality of continuous belts each mounted on one of said sprockets and extending over said guide bars and said gears, each of said belts having a plurality of numbers printed thereon, said sprockets and gears being within said belts and said belts being completely confined within said U-shaped frame, said gears all being of the same outside diameter but being toothed to provide ratios of 2:1 and 5:1 whereby different ratios are obtained with minimum space requirements.

2. In a digital counter indicator; means to display maximum size numbers for a given space comprising a U-shaped frame, a first and second parallel shafts rotatably mounted in said frame, a pair of guide bars mounted in said frame across the open end of said U-shaped frame and parallel to said shafts, a plurality of sprockets in said first shaft, a plurality of interlocking gears mounted on said first and second shafts, said gears being intermittently toothed to provide multiple ratios with minimum space requirements, a plurality of continuous belts each mounted on one of said sprockets and extending over said guide bars and said gears, each of said belts having a plurality of numbers printed thereon, said sprocket gears being within said belts and said belts being completely confined within said U-shaped frame, and window means for viewing said numbers on both sides and at the open end of said U-shaped frame.

3. Apparatus as in claim 2 having a first gear on said first shaft having four equally spaced teeth on one-half of its circumference, a second gear mounted on said second shaft and meshing with said first gear, said second gear having two sets of equally spaced teeth adapted to mesh with the teeth on said first gear to provide a 2:1 ratio, a third gear on said second shaft having a single tooth, and a fourth gear on said first shaft having five equally spaced recesses adapted to receive said single tooth to thereby provide a ratio of 5:1.

References Cited in the file of this patent

UNITED STATES PATENTS

| | | |
|---|---|---|
| 1,257,926 | Poole | Feb. 26, 1918 |
| 2,074,066 | Wheeler | Mar. 16, 1937 |
| 2,907,522 | Gannett | Oct. 6, 1959 |

FOREIGN PATENTS

| | | |
|---|---|---|
| 551,944 | Great Britain | 1943 |